US000001121H

United States Statutory Invention Registration [19]

[11] Reg. Number: H1121

[43] Published: Dec. 1, 1992

Carroll et al.

[54] PRIMER FEED MECHANISM

[75] Inventors: Richard Carroll, Rensselaer; Kenneth Lucas, Albany, both of N.Y.

[73] Assignee: The United States of America as represented by the Secretary of the Army, Washington, D.C.

[21] Appl. No.: 894,885

[22] Filed: Jun. 8, 1992

Related U.S. Application Data

[63] Continuation of Ser. No. 785,964, Oct. 31, 1991.

[51] Int. Cl.[5] ..... F41A 19/57

[52] U.S. Cl. ..... 89/27.13

[56] References Cited

U.S. PATENT DOCUMENTS 1,020,849 3/1912 Smith et al. ..... 89/27.13

1,095,558 5/1914 Dawson et al. ..... 89/27.13

*Primary Examiner*—Stephen C. Bentley

*Attorney, Agent, or Firm*—Anthony T. Lane; Edward Goldberg; Michael Sachs

[57] ABSTRACT

A primer feed mechanism device for use with a carrier assembly of a large caliber cannon. The device includes a body for mounting the device to the carrier assembly so as to interface with the carrier assembly to position the device on one side of the breech of the cannon. It further includes a body cam surface and a tray assembly which provides a cam path for movement thereof. The tray assembly includes slide rails for engagement with the body and an injector arm which is operably controlled by the body cam surface. Also included is a control arm assembly housed in the carrier assembly for engaging the cam path at one end and for engaging the tray assembly at its other end. The control arm assembly is adapted to move the tray assembly from a first ready-to-fire position to a primer extract/inject position, the movement being controlled from the control arm assembly and the breech mechanism of the cannon. The device also includes a magazine mounted on the tray assembly for housing a plurality of primers for insertion into the cannon, including a radial slot in one side to permit the tray assembly injector arm to cooperatively engage and move primers contained in the magazine upon movement of the arm to the ready-to-fire position.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRIMER FEED MECHANISM

The invention described herein may be made, used, or licensed by or for the Government for Governmental purposes without the payment to me of any royalties thereon or therefor.

This application is a continuation of application Ser. No. 07,785,964, filed Oct. 31, 1991.

FIELD OF THE INVENTION

The present invention relates to a mechanism for feeding primers, and more particularly to a device for feeding primers to large caliber cannons and the line in an automatic mechanism.

BACKGROUND OF THE INVENTION

The technical advancement of heavy armored/mechanized weapons and the necessity of providing responsive, effective fires throughout the supported commander's area of influence has created a need for enhanced rate of fire and reduced labor intensiveness of the crew. Presently, for large caliber cannon with interrupted screw block breech mechanisms such as 155 mm cannons and the like, percussion primers are loaded by hand. One primer is placed in the spindle primer chamber and the firing mechanism is thereafter manually moved over the primer in the ready-to-fire position. This has lead naturally to human errors and problems inserting the primer, especially when the light is dim. Lack of space and/or coordination are additional cannon problems associated with hand loading.

Until the present invention, there has not been an effective alternative to manual loading of primers. There is a great need for a device which can automatically feed live percussion primers and eject spent primer cases in large caliber cannon of 155 mm or more.

It is, therefore, an object of this invention to provide a device for loading primers in large caliber cannons and the like.

Another object of the present invention is to provide a device for feeding primers automatically in order to save time during firing cycles.

Yet another object of the present invention is to provide a device for automatically feeding printers which eliminates the need of one crew member, to thereby reduce crew size or provide additional availability for other tasks.

Still another object of the present invention is to provide a device for automatically feeding primers to large cannons and the like which is safe, dependable, and easy to maintain.

Other objects will appear hereinafter.

SUMMARY OF THE INVENTION

It has now been discovered that the above and other objects of the present invention may be accomplished in the following manner. Specifically, a primer feed mechanism device for use with a carrier assembly of a large caliber cannon is now available which functions to accomplish these and other objects.

The device includes a body for mounting the device to the carrier assembly of said cannon so as to interface with the carrier assembly to position the device on one side of the breech of the cannon. It further includes a body cam surface and a tray assembly means which provides a cam path for movement thereof. The tray assembly means includes slide rails for engagement with the body and an injector arm which is operably controlled by the body cam surface.

Also included is a control arm assembly means housed in the tray assembly means for engaging the cam path at one end and for engaging the carrier assembly at its other end. The control arm assembly means is adapted to move the tray assembly means from a ready-to-fire position to a primer extract/inject position. The movement on the tray assembly means is controlled by cooperative action between the control arm assembly and the breech mechanism of the cannon.

The device also includes a magazine mounted on the tray assembly for housing a plurality of primers for insertion into the cannon, including a radial slot in one side to permit the tray assembly injector arm to cooperatively engage and move primers contained in the magazine upon movement of the arm to the ready-to-fire position.

In a preferred embodiment, the body includes a cavity for housing a primer extractor for removing primers after firing. The tray assembly means further includes an integral receiver for mounting said magazine assembly means.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
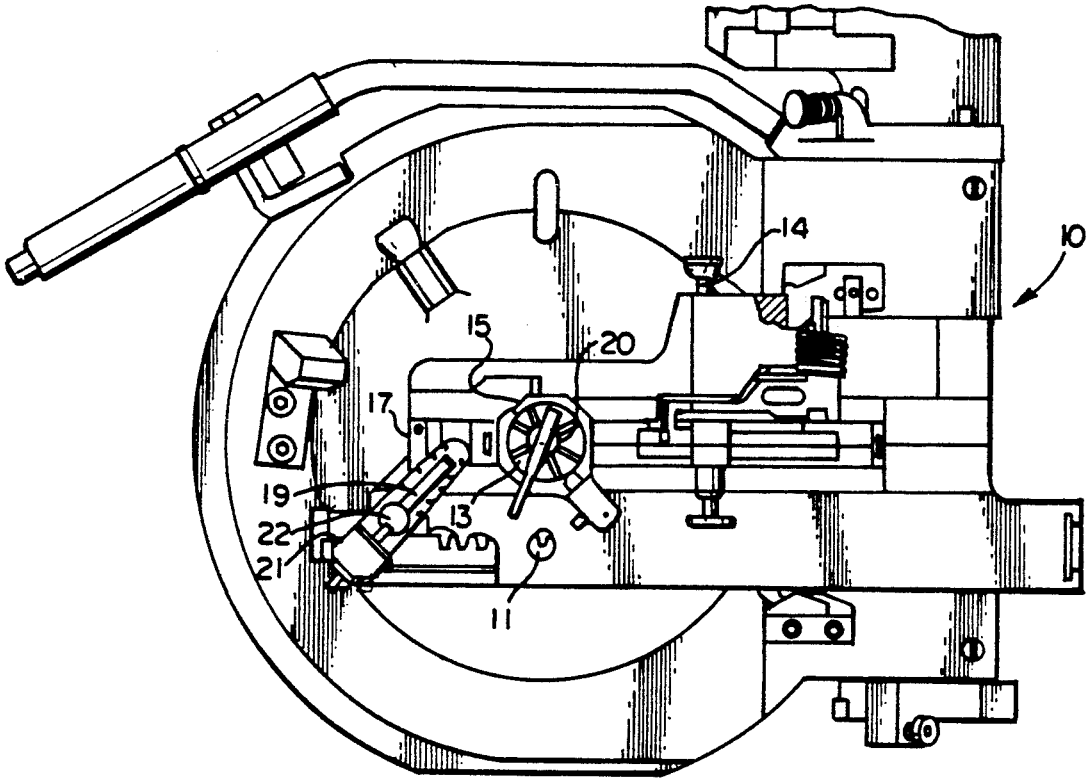
FIG. 1 is a side elevational view of the device of this invention, installed on a 155 mm howitzer of conventional design.

The device of this invention is designed to be used with a carrier assembly of a large caliber cannon. As shown in FIG. 1, the cannon, shown generally by reference 10, included a rack 11 and a firing mechanism assembly 13 of conventional design. The cannon shown in FIG. 1 is a 155 mm howitzer.

Attached to the canon 10 is a body assembly 15, a tray assembly 17, and a control arm assembly 19, shown in proper relationship to the firing mechanism assembly 13. Body assembly 15 is slid over the spindle shaft 20 to engage a slot in the shaft and positioned on one side of the breech of cannon 10. Body 15 is locked in position by a pin.

Figure 2:
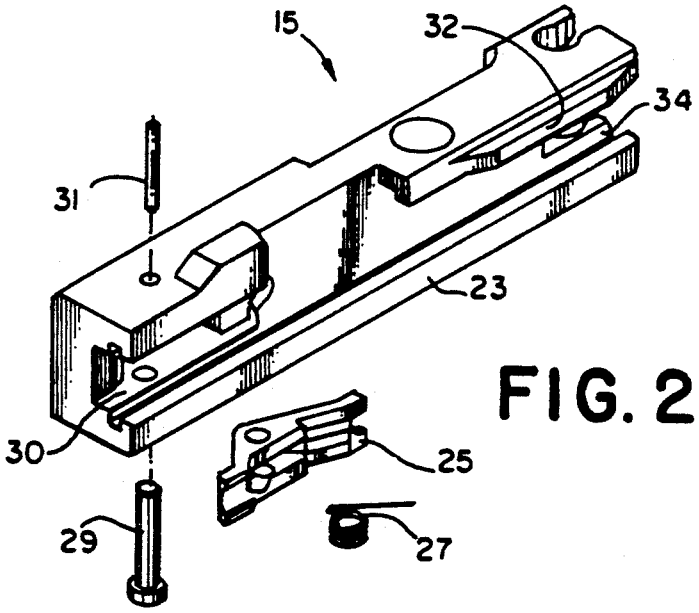
FIG. 2 is an exploded view of the body assembly of the present invention.

As shown in FIG. 2, the body assembly 15 includes a body portion 23, which includes a primer extractor 25 and a torsion spring 27, both of which are held in place by extractor shaft 29 and spring pin 31. Cavity 30 is located on the left side center of body 23 to house the primer extractor 25. A cam surface 32 is provided on the top side of body 23 and is used to control the motion of an injector arm, later described.

Figure 3:
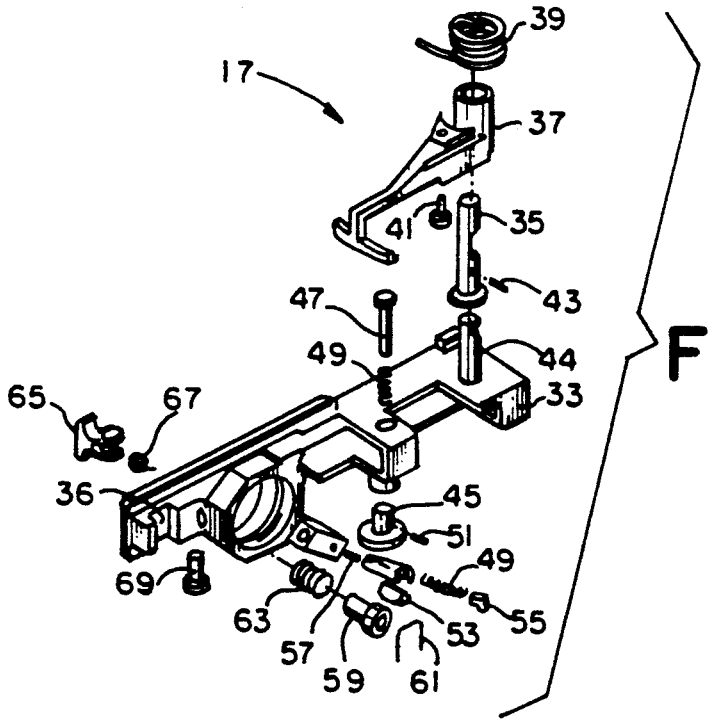
FIG. 3 is an exploded view of the tray assembly of the present invention.

A tray assembly 17, shown in detail in FIG. 3, fits into body portion 23 along the body way 34. As seen in FIG. 3, the fully assembled primer feed mechanism tray 33 is designed to slide into body way 34 so that the body portion 23 controls the movement of tray 33. Tray 33 has a cam path 36 which engages a control arm assembly 19, later described, to actually move the primer feed mechanism tray 33. At the left end of tray 33 is the firing mechanism, and the firing pin assembly is located under the firing mechanism. Also included is the extractor actuator in the rectangular cavity.

Roller 41 is screwed to injector arm 37 which is positioned on extension shaft 35 with inside tang of return spring 39 aligned in slot at top of extension shaft 35 and outside tang of return spring 39 aligned in slot of injector arm 37. A cylindrical cavity is provided inside the extension shaft 35 to permit assembly to the tray shaft 44. A shaft 43 is pressed into and through the top of the cylindrical cavity of the extension shaft 35 and aligns with the slot in the top of the tray shaft 44 when assembled.

During assembly, a preload is applied to the return spring 39 to lock the outside tang to the injector arm 37 and to lock the shaft 43 of the extension shaft 35 into the slot on the tray shaft 44 via the action of the inside tang of the return spring 39 against the slot at the top of the extension shaft 35. Nob 45 is central in the tray 33, and is held by shaft 47 and spring 49, itself held by spring pin 51. Shaft 47 locks the magazine 101, later described, to the tray 33. Tray 33 engages body 23 in the ways 34 provided to guide and support the tray 33 as it moves from a ready-to-fire position to a primer extract/inject position.

A plunger 53 and plug 55 are held in by pin 57, while the firing pin 59 is positioned by retainer 61 and spring 63. Opposite firing pin 59 is extractor actuator 59, which is positioned by torsion spring 67 and shaft 69.

Figure 4:
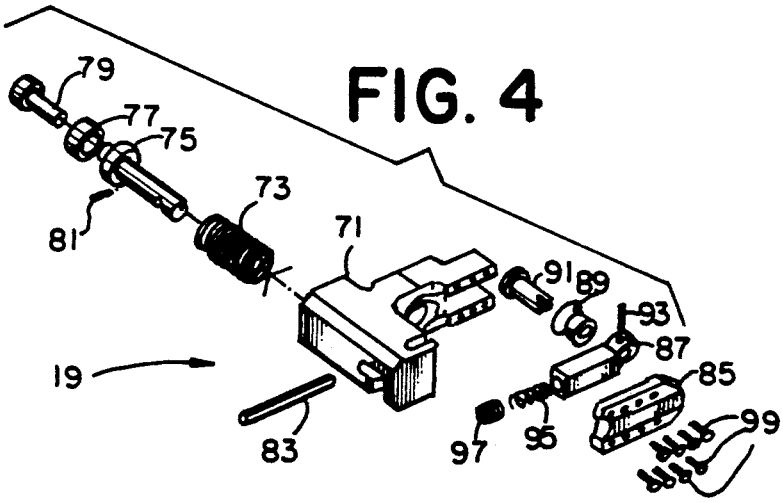
FIG. 4 is an exploded view of the control arm assembly of the present invention.

Turning now to FIG. 4, the control arm assembly 19 includes control arm 71, into which spring 73, plunger shaft 75, roller 77 and retainer 79 are assembled, using spring pin 81 and spring pin 83. At the other end, cover 85 encloses positioner 87 and roller 89 on roller shaft 91, using dowel pin 93. A number of spring washers 95 are assembled in position 87 by retainer 97, and cover 85 is fastened to control arm 71 via cap screws 99.

Figure 5:
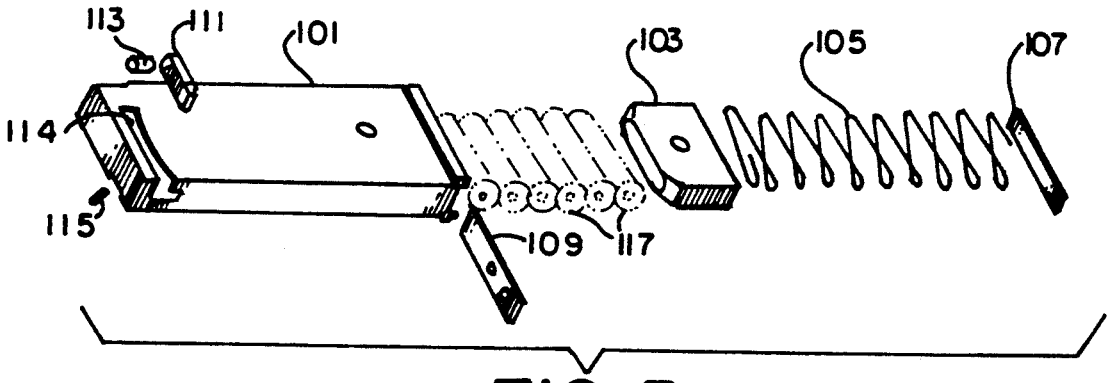
FIG. 5 is an exploded view of the magazine assembly of the present invention.

The magazine holding the primers is shown in FIG. 5. Magazine 101 feeds primers as needed. Pusher 103 is biased by primer feed spring 105 against stop 107 and retainer 109. During feeding, finger 111 and spring 113 are held by pin 115 and permit primers to be moved in radial slot 114. Slot 114 is the location into which the injector arm 37 is placed to move primers 117.

The primer feed mechanism of this invention is energized during the counterrecoil cycle of the weapon system. In order to understand the invention, it is necessary to describe some basic operational features of conventional cannon activity and the breech mechanism actuation. As the cannon returns in battery during the counterrecoil cycle, the breech operating crank engages a cam path in the cam plate which rotates the crank. A segmented gear turns with the operating crank and is geared to a rack gear. Shown in FIG. 1 is the rack 11, as both the segmented gear and the rack gear are housed in the carrier assembly to which the device of this invention is attached.

The opposite end of the rack gear is geared to the breech block. As the crank is rotated, the breech block rotates to unlock and then the breech block/carrier is swung open to a 90 degree position where it is locked by the crank and cam plate interaction. To close the breech block, it is necessary to lift upward on the cam plate, allowing the springs tied into the crank and rack gear (which have been energized during the opening cycle) to swing the breech block/carrier closed and to rotate the breech block to the locked position.

The prime feed mechanism of the present invention operates during the unlocking and locking of the breech block. A magazine assembly 101 with up to six primers 117 is inserted into the primer feed mechanism tray assembly 17 prior to the start of a firing mission. As the breech is opened to load the first round, during the unlocking of the breech block, the breech rack gear 11 in FIG. 1 moves to the right, as one is facing the breech. It is noted that the breech is opened manually prior to the first round of a mission. This action rotates the lower end of the control arm assembly 19 by the engagement of roller 77 in cam path 21 at the extreme left end of rack gear 11.

The control arm assembly 19 pivots about shaft 22 in the carrier assembly. The lower end of control arm assembly 19 is driven by the action of cam path 21, of rack gear 11, against roller 77, while the other end of the control arm assembly 19 moves tray 33 to the left. As the tray 33 moves to the left, two functions occur. First, the extractor actuator 65 housed in tray 33 cams the extractor 25 and ejects a spent primer case, assuming there is a spent case from a previous round. Second, the primer injector arm 37 rides down the cam surface 32 of body 23 until it contacts a primer 117 in magazine 101. At the end of travel, governed by a positive stop between tray 33 and pin 14, primer injector arm 37 injects primer 117 into the primer chamber of the cannon. For a 155 mm cannon, the primer feed mechanism tray 33 moves to the left a total of about 3.3 inches during this breech block unlocking cycle.

After loading the cannon with the projectile and main charge, the breech block is closed. The breech rack gear 11 moves to the left, rotating the control arm assembly 19 and moving the tray 33 to the right about 3.3 inches, thus positioning the firing pin 59 over the loaded primer. Again, there is a positive stop to the right for the tray 33, just as there was to the left, using the same stop pin 14. It is of particular advantage in this device that the firing pin 59 is not in line with the primer 117 until the breech block is fully locked closed. The cannon is now in the ready-to-fire position.

During a misfire/checkfire, when it is necessary to remove the live primer and replace it if desired, the primer feed mechanism of this invention is designed to function without opening the breech block. To accomplish this, it is necessary to disengage the control arm assembly 19 from the rack gear 11 by lifting up and rotating the plunger shaft 75 to 90 degrees in the control arm assembly 19, to reach a locked and disengaged position. This enables tray 33 to be manually moved the 3.3 inches through the complete cycle, if desired, to eject, load and position the firing pin in the ready-to-fire configuration.

A number of tests have been performed using the device of this invention. Operation of the primer feed mechanism is satisfactory and no functional problems were observed. Tests of over 450 rounds showed only two misfunctions, both of which were caused by contamination such as, in one case, a relatively large piece of bag material in the primer chamber which caused the primer to protrude approximately 0.5 inches from the fully seated position.

While particular embodiments of the present invention have been illustrated and described herein, it is not intended that these illustrations and descriptions limit the invention. Changes and modifications may be made herein without departing from the scope and spirit of the following claims.

We claim:

1. A primer feed mechanism device for use with a carrier assembly of a large caliber cannon, comprising:

a body for mounting said device to said carrier assembly, including means for interfacing with said carrier assembly to position said device on one side of the breech of said cannon;

tray assembly means for providing a cam path for movement thereof, including slide rails for engagement with said body and an injector arm;

control arm assembly means housed in said carrier assembly means and including means for engaging said cam path at one end and for engaging said tray assembly at its other end, said control arm assembly means for moving said tray assembly from a first ready-to-fire position to a primer extract/inject position; and magazine assembly means mounted on said tray assembly means for housing a plurality of primers for insertion into said cannon.

2. The device of claim 1, wherein said body includes a cam surface for controlling the motion of said tray assembly means injector arm.

3. The device of claim 2, wherein said body includes a cavity for housing a primer extractor for removing primers after firing.

4. The device of claim 1, wherein said tray assembly means further includes an integral receiver housing for mounting said magazine assembly means.

5. The device of claim 4, wherein said magazine assembly means includes a radial slot in one side to permit said tray assembly injector arm to cooperatively engage and move primers contained in said magazine upon movement of said arm to said ready-to-fire position.

6. The device of claim 1, wherein said control arm assembly means is connected to the breech mechanism of said cannon to cause movement from said ready-to-fire position to said primer extract/inject position upon movement of said breech mechanism.

7. A primer feed mechanism device for use with a carrier assembly of a large caliber cannon, comprising:

a body for mounting said device to said carrier assembly, including means for interfacing with said carrier assembly to position said device on one side of the breech of said cannon and further including a body cam surface;

tray assembly means for providing a cam path for movement thereof, including slide rails for engagement with said body and an injector arm, said arm being guided by said body cam surface;

control arm assembly means housed in said carrier assembly means and including means for engaging said cam path at one end and for engaging said tray assembly at its other end, said control arm assembly means for moving said tray assembly from a first ready-to-fire position to a primer extract/inject position, said control arm assembly connected to the breech mechanism of said cannon; and magazine assembly means mounted on said tray assembly means for housing a plurality of primers for insertion into said cannon, including a radial slot in one side to permit said tray assembly injector arm to cooperatively engage and move primers contained in said magazine upon movement of said arm to said ready-to-fire position.

8. The device of claim 7, wherein said body includes a cavity for housing a primer extractor for removing primers after firing.

9. The device of claim 7, wherein said tray assembly means further includes an integral receiver housing for mounting said magazine assembly means.

* * * * *